US010239440B2

(12) United States Patent
Asaoka (10) Patent No.: US 10,239,440 B2
(45) Date of Patent: Mar. 26, 2019

(54) ILLUMINATION APPARATUS FOR VEHICLE

(71) Applicant: TOYOTA JIDOSHA KABUSHIKI KAISHA, Toyota-shi, Aichi (JP)

(72) Inventor: Kazuya Asaoka, Seto (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 15/316,629

(22) PCT Filed: May 28, 2015

(86) PCT No.: PCT/JP2015/065368
§ 371 (c)(1),
(2) Date: Dec. 6, 2016

(87) PCT Pub. No.: WO2015/190299
PCT Pub. Date: Dec. 17, 2015

(65) Prior Publication Data
US 2017/0144584 A1    May 25, 2017

(30) Foreign Application Priority Data
Jun. 13, 2014    (JP) .................................. 2014-122487

(51) Int. Cl.
*B60Q 1/00* (2006.01)
*B60Q 1/52* (2006.01)
(Continued)

(52) U.S. Cl.
CPC ............. *B60Q 1/0023* (2013.01); *B60Q 1/04* (2013.01); *B60Q 1/525* (2013.01); *B60R 11/04* (2013.01);
(Continued)

(58) Field of Classification Search
None
See application file for complete search history.

(56) References Cited

U.S. PATENT DOCUMENTS 6,476,731 B1 *  11/2002  Miki ................... B60Q 1/0023
                                                          340/435
7,233,311 B2    6/2007   Okubo et al.
(Continued)

FOREIGN PATENT DOCUMENTS

DE        10034381 A1    1/2002
DE    10 2011 081 396 A1    2/2013
(Continued)

OTHER PUBLICATIONS

Office Action issued in U.S. Appl. No. 15/317,175 dated Apr. 3, 2010.
(Continued)

*Primary Examiner* — Hung Q Dang
(74) *Attorney, Agent, or Firm* — Finnegan, Henderson, Farabow, Garrett & Dunner, LLP (57) ABSTRACT

An illumination apparatus for a vehicle includes a projector configured to project an image of visible light; an obstacle detection apparatus configured to detect an obstacle; and a processing apparatus configured to predict a travel area of the vehicle after a predetermined time or a predetermined distance of travel, project a first image with the projector in the predicted travel area upon no obstacle in the predicted travel area being detected by the obstacle detection apparatus, and project a second image, which is different from the first image, with the projector in the predicted travel area upon the obstacle in the predicted travel area being detected by the obstacle detection apparatus.

3 Claims, 5 Drawing Sheets

(51) Int. Cl.
   *G06K 9/00* (2006.01)
   *B60R 11/04* (2006.01)
   *B60Q 1/04* (2006.01)

(52) U.S. Cl.
   CPC .... *G06K 9/00805* (2013.01); *B60Q 2300/112* (2013.01); *B60Q 2300/122* (2013.01); *B60Q 2300/45* (2013.01); *B60Q 2400/50* (2013.01); *B60R 2300/107* (2013.01); *B60R 2300/301* (2013.01); *B60R 2300/307* (2013.01); *B60R 2300/804* (2013.01); *B60R 2300/8033* (2013.01); *B60R 2300/8093* (2013.01)

(56) References Cited

U.S. PATENT DOCUMENTS

| | | | |
|---|---|---|---|
| 2003/0076414 A1* | 4/2003 | Sato | G01S 11/12 348/148 |
| 2003/0146827 A1 | 8/2003 | Koike | |
| 2006/0125616 A1 | 6/2006 | Song | |
| 2007/0147664 A1* | 6/2007 | Kubota | B60W 40/04 382/106 |
| 2008/0129544 A1 | 6/2008 | Augst | |
| 2008/0198372 A1 | 8/2008 | Pan | |
| 2009/0268027 A1* | 10/2009 | Yang | B60R 1/00 348/148 |
| 2010/0017111 A1 | 1/2010 | Stefani | |
| 2012/0044090 A1 | 2/2012 | Kahler et al. | |
| 2013/0090803 A1 | 4/2013 | Stählin et al. | |
| 2013/0093851 A1* | 4/2013 | Yamamoto | G01S 15/931 348/46 |
| 2013/0120572 A1* | 5/2013 | Kwon | B62D 15/0295 348/148 |
| 2013/0279186 A1 | 10/2013 | Okamoto | |
| 2014/0028980 A1 | 1/2014 | Othmer | |
| 2014/0133700 A1* | 5/2014 | Seki | G06K 9/00805 382/103 |
| 2014/0214260 A1 | 7/2014 | Eckert et al. | |
| 2014/0267415 A1 | 9/2014 | Tang et al. | |
| 2015/0066284 A1 | 3/2015 | Yopp | |
| 2015/0149021 A1 | 5/2015 | Duncan et al. | |
| 2015/0203023 A1 | 7/2015 | Marti et al. | |
| 2015/0224926 A1 | 8/2015 | Mochizuki et al. | |
| 2015/0228195 A1 | 8/2015 | Beaurepaire et al. | |
| 2015/0254515 A1 | 9/2015 | Zobel | |
| 2015/0336502 A1 | 11/2015 | Hillis et al. | |
| 2016/0200317 A1 | 7/2016 | Danzl et al. | |
| 2017/0144584 A1 | 5/2017 | Asaoka | |

FOREIGN PATENT DOCUMENTS

| | | |
|---|---|---|
| DE | 10 2011 119 923 A1 | 5/2013 |
| EP | 1 916 154 A1 | 4/2008 |
| FR | 2967625 A1 | 5/2012 |
| JP | 2004-009829 A | 1/2004 |
| JP | 2008-143505 A | 6/2008 |
| JP | 2008-174192 | 7/2008 |
| JP | 2009-1164 | 1/2009 |
| JP | 2013-103628 | 5/2013 |
| JP | 2013-125433 | 6/2013 |
| JP | 2014-013524 A | 1/2014 |
| JP | 2014-058173 A | 4/2014 |
| JP | 2015-153057 A | 8/2015 |
| SU | 1277172 A1 | 12/1985 |
| WO | WO 2013/034142 A1 | 3/2013 |
| WO | WO2014/009130 A1 | 1/2014 |

OTHER PUBLICATIONS

U.S. Appl. No. 15/317,176 filed Dec. 8, 2016.
Notice of Allowance issued in U.S. Appl. No. 15/317,176 dated Sep. 12, 2018.
Corrected Notice of Allowability issued in U.S. Appl. No. 15/317,176 dated Dec. 31, 2018.

* cited by examiner

ILLUMINATION APPARATUS FOR VEHICLE

CROSS-REFERENCE TO RELATED APPLICATIONS

This application is a national phase application of International Application No. PCT/JP2015/065368, filed May 28, 2015, and claims the priority of Japanese Application No. 2014-122487, filed Jun. 13, 2014, the content of both of which is incorporated herein by reference.

TECHNICAL FIELD

The disclosure is related to an illumination apparatus for a vehicle.

BACKGROUND ART

A road surface rendering apparatus is known (see Patent Document 1, for example) in which a travel area of a vehicle after a predetermined time is predicted and visible light is radiated to an area corresponding to the predicted travel area.

CITATION LIST

[Patent Document 1] Japanese Laid-open Patent Publication No. 2013-103628

SUMMARY

Technical Problem

However, according to the configuration disclosed in Patent Document 1, because the illumination in the travel area does not change depending on whether an obstacle exists in the travel area, there may be a probability that a driver of the vehicle cannot immediately recognize the obstacle.

It is an object of the present disclosure to provide an illumination apparatus for a vehicle which enables a driver, etc., to immediately recognize an obstacle.

Solution to Problem

According to an aspect of the disclosure, an illumination apparatus for a vehicle is provided, and the illumination apparatus includes: a projector configured to project an image of visible light;
an obstacle detection apparatus configured to detect an obstacle; and
a processing apparatus configured to predict a travel area of the vehicle after a predetermined time or a predetermined distance of travel, project a first image with the projector in the predicted travel area upon no obstacle in the predicted travel area being detected by the obstacle detection apparatus, and project a second image, which is different from the first image, with the projector in the predicted travel area upon the obstacle in the predicted travel area being detected by the obstacle detection apparatus.

Advantageous Effects of Invention

According to the disclosure, it becomes possible to obtain an illumination apparatus for a vehicle which enables a driver, etc., to immediately recognize an obstacle.

DESCRIPTION OF EMBODIMENTS

In the following embodiments are described in detail with reference to appended drawings.

Figure 1:
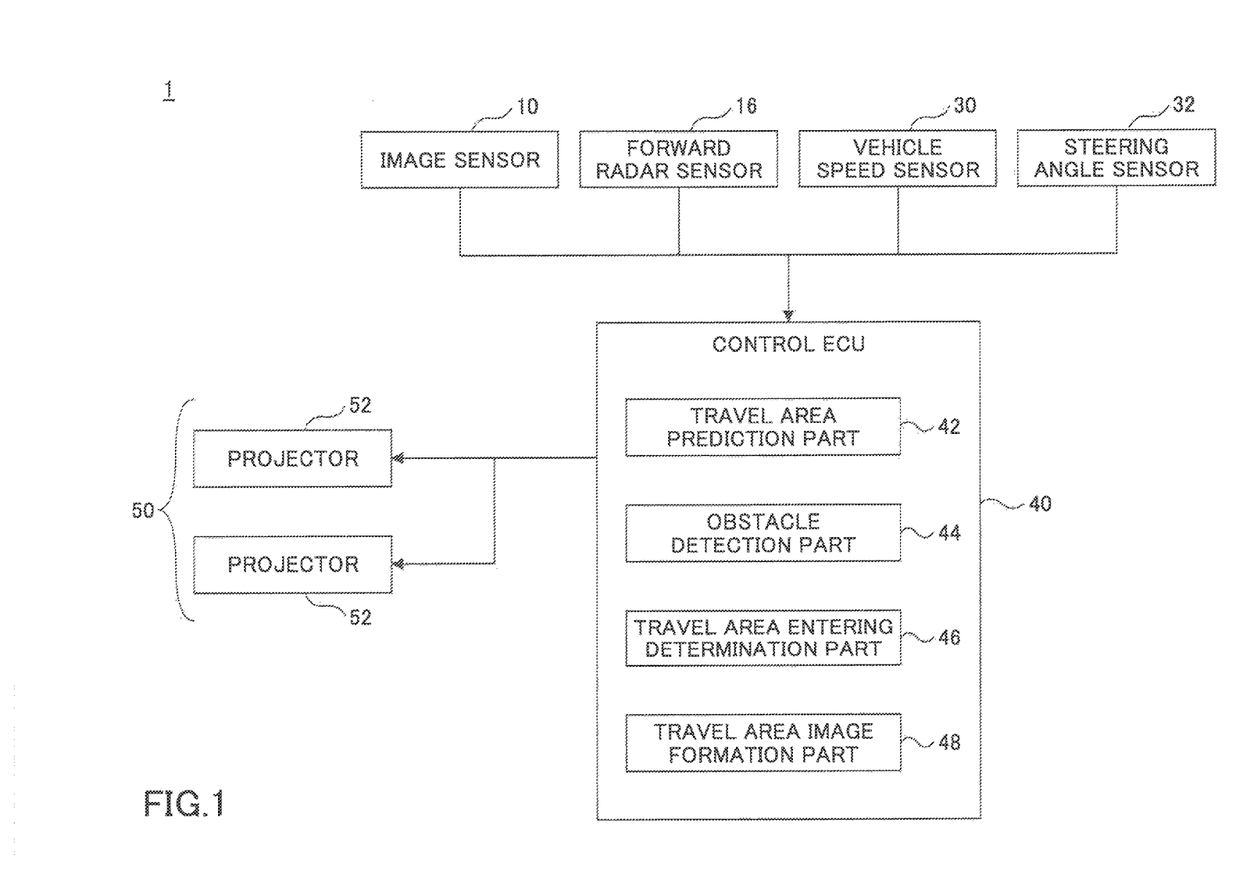
FIG. 1 is a diagram illustrating a configuration of an illumination apparatus 1 for a vehicle according to an embodiment.

FIG. 1 is a diagram illustrating a configuration of an illumination apparatus 1 for a vehicle according to an embodiment. The illumination apparatus 1 for a vehicle includes an image sensor 10, a forward radar sensor 16, a vehicle speed sensor 30, a steering sensor 32, a control ECU (Electronic Control Unit) 40, and head lamps 50, as illustrated in FIG. 1.

The image sensor 10 includes a camera, which includes imaging elements such as CCDs (charge-coupled device), CMOSs (complementary metal oxide semiconductor), etc., and an image processor to recognize a state of an obstacle. The camera of the image sensor may be of a stereo type. The image sensor detects, based on an image recognition result, the information which represents a relationship between the obstacle and the host vehicle such as a relative speed, position information of the obstacle with respect to the host vehicle, for example, at a predetermined cycle. The position information of the obstacle includes information related to the position (distance) of the obstacle in the back-and-forth direction of the host vehicle, and information related to the lateral position of the obstacle in the lateral direction (width direction). The lateral position of the obstacle may be calculated based on a center position of a pixel group related to the obstacle in the lateral direction. Alternatively, the lateral position of the obstacle may be calculated as a range between a left end lateral position and a right end lateral position. The obstacle information thus obtained with the image sensor may be transmitted to the control ECU 40 at a predetermined cycle, for example. It is noted that the image processing function of the image processor (a function of calculating a position of the obstacle, for example) may be implemented by the control ECU 40. It is noted that the camera of the image sensor 10 may be a dedicated sensor for obstacle detection as described below or may be used commonly with other applications (for example, a camera for lane keeping assist, etc.). Further, the image sensor 10 may be a camera which obtains either a color image or a monochrome image.

The forward radar sensor 16 detects a state (obstacle information) of the obstacle in front of the host vehicle using an electric wave (millimeter wave, for example), a light wave (laser, for example) or an ultrasonic wave as a detection wave. The forward radar sensor 16 detects information which represents a relationship between the obstacle and the host vehicle such as a relative speed, a relative distance and a direction (a lateral position) of the obstacle with respect to the host vehicle, for example, at a predetermined cycle. It is noted that if the forward radar sensor 16 is a millimeter wave radar sensor, the millimeter wave radar sensor may be of an electronic controlled scanning type, for example. In this case, the relative speed of the obstacle is detected using a Doppler frequency (frequency shift) of the electric wave, the relative distance of the obstacle is detected using a delayed time of the reflection wave, and the direction of the obstacle is detected based on a shift difference of the received waves between a plurality of reception antennas. The obstacle information thus obtained is transmitted to the control ECU 40 at a predetermined cycle. It is noted that any functions of the forward radar sensor 16 (a function of calculating a position of the obstacle, for example) may be implemented by the control ECU 40.

The vehicle speed sensor 30 outputs an electric signal according to rotation speed of vehicle wheels (vehicle speed pulses) to the control ECU 40. The steering sensor 32 outputs an electric signal according to a steering angle to the control ECU 40.

The control ECU 40 mainly includes a microprocessor that includes a CPU, a ROM, a RAM, etc., which are interconnected via buses (not shown). The control ECU 40 includes a travel area prediction part 42, an obstacle detection part 44, a travel area entering determination part 46, and a travel area image formation part 48. The parts 42, 44, 46, and 48 may be implemented by the CPU executing programs stored in a storage device such as ROM. Further, the parts 42, 44, 46, and 48 are not necessarily incorporated in the same ECU unit and thus may be implemented by several ECUs in cooperation.

The head lamps 50 are provided on either left and right sides of the front portion of the vehicle. The head lamps 50 emits visible light toward the forward scene. The head lamps 50 can render the image of visible light on a road surface. For this purpose, the head lamps 50 include a projector (projecting apparatus) 52 that is capable of projecting the image, for example. The projectors 52 may be provided in either left or right head lamp 50. The projectors 52 may be implemented by high beam lamps (additional high beam lamps other than high/low combination units, for example) in either left or right head lamp 50. The projectors 52 have a 3-dimension rendering function based on Projection Mapping technique such that the image is superimposed on the road surface or the obstacle on the road surface. Further, the projectors 52 may be capable of emitting the visible light other than white color to enable the rendering on the road surface in the daytime.

Figure 2:
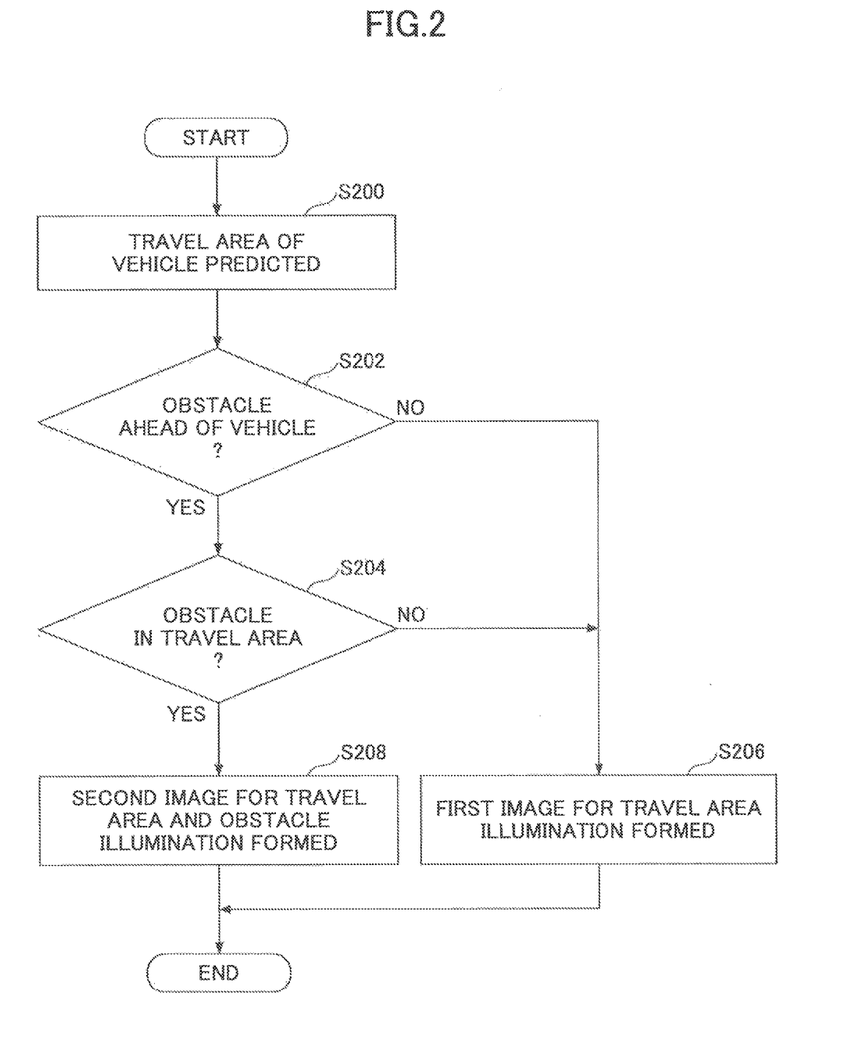
FIG. 2 is a flowchart of an example of process executed by a control ECU 40.

FIG. 2 is a flowchart of an example of a process executed by the control ECU 40. The process illustrated in FIG. 2 may be initiated when an ignition switch of the vehicle is turned on, and then may be repeated at a predetermined cycle. Further, the process illustrated in FIG. 2 may be initiated under a condition that the head lamps 50 have been turned on.

In step S200, the travel area prediction part 42 predicts a travel area of the vehicle after a predetermined time ΔT1 or a travel of predetermined distance D1 (represented by "after the predetermined time ΔT1", hereinafter). A way of predicting the travel area after the predetermined time or the predetermined distance travel is arbitrary. For example, the travel area prediction part 42 may predict, based on vehicle speed information from the vehicle speed sensor 30 and steering information from the steering sensor 32, the travel area after the predetermined time ΔT1. The predetermined distance a1 may be varied according to the vehicle speed such that the predetermined distance D1 becomes greater as the vehicle speed becomes higher, or may be a fixed value. It is noted that the predetermined time ΔT1 is arbitrary; however, the predetermined time ΔT1 may be set based on a value of TTC (Time to Collision) at which a collision prevention apparatus (an automatic brake, etc.) is to be operated, for example. For example, the predetermined time ΔT1 may be the same as the value of TTC at which a collision prevention apparatus is to be operated, or slightly longer than it.

Figure 3:
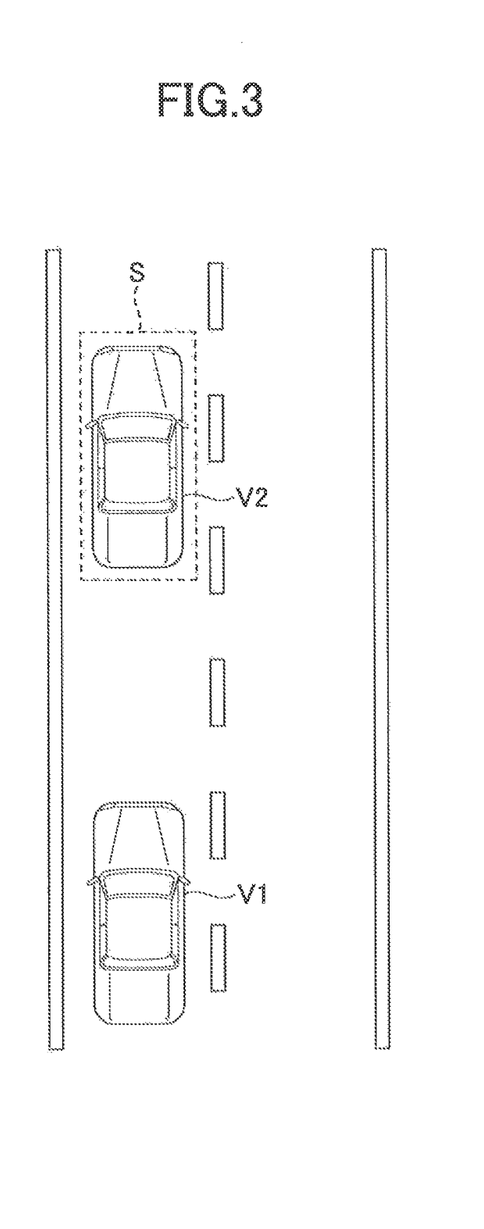
FIG. 3 is a diagram explaining a travel area.

In FIG. 3, the travel area S on the road is schematically illustrated in a plan view. In the example illustrated in FIG. 3, the travel area S is generated based on a vehicle outline at a vehicle position V2 after the predetermined time ΔT1 with respect to the current vehicle position V1. The travel area S may circumscribe the vehicle outline at the vehicle position V2 with or without a predetermined margin. However, the travel area S may be only a part of the vehicle outline (a front portion, for example) at the vehicle position V2. Further, in the example illustrated in FIG. 3, a direction of the travel area S is constant; however, if the direction of the vehicle after the predetermined time ΔT1 will change, the direction of the travel area S may be changed accordingly.

In step S202, the obstacle detection part 44 determines, based on the obstacle information from the image sensor 10 and/or the forward radar sensor 16, whether there is any obstacle in front of the vehicle. The obstacle to be determined is typically a stationary object, and may include an uneven spot (the uneven spot that affects the travel) on the road, a fallen stone, etc., for example. Further, the obstacle may include a stopped vehicle and a pedestrian. The pedestrian is a moving object, but its movement speed is substantially smaller than that of the vehicle. For this reason, the obstacle detection part 44 may determine whether there is any obstacle whose movement speed is less than or equal to a predetermined value. The movement speed of the obstacle may be determined based on the obstacle information from the image sensor 10 and/or the forward radar sensor 16. If the obstacle is detected in front of the vehicle, the process routine goes to step 204, otherwise the process routine goes to step 206.

In step S204, the travel area entering determination part 46 determines whether the obstacle in front of the vehicle enters the travel area. Specifically, the travel area entering determination part 46 determines whether the position of the obstacle is within the travel area predicted in step S200 described above. If it is determined that the obstacle in front of the vehicle enters the travel area, the process routine goes to step 208, otherwise the process routine goes to step 206.

In step S206, the travel area image formation part 48 forms (renders) a first image for travel area illumination, and projects the formed first image in the travel area with the projectors 52. The first image is arbitrary; however, the first image may be an image that merely brightens the travel area S as a whole as illustrated in FIG. 3, for example. Alternatively, the first image may be a silhouette of the vehicle (see V2 in FIG. 3) rendered in the travel area S as illustrated in FIG. 3, for example. It is noted that lines of such a silhouette may be formed with a shade (i.e., a part in which the light is not illuminated, or a part in which the illumination strength is lower than that of a neighboring area).

Figure 4:
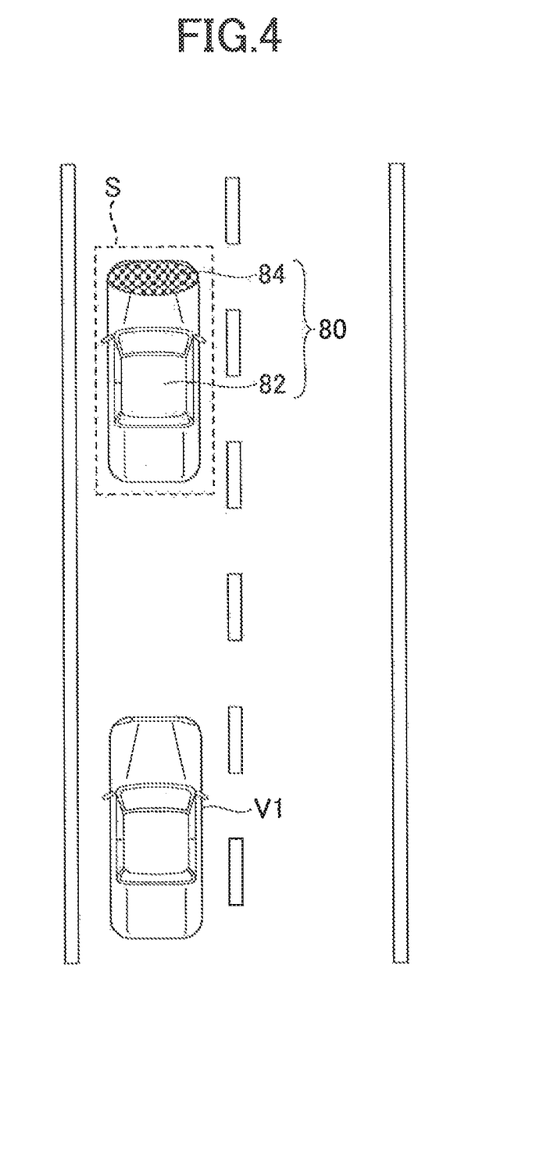
FIG. 4 is a diagram explaining a second image for travel area and obstacle illumination.
Figure 5:
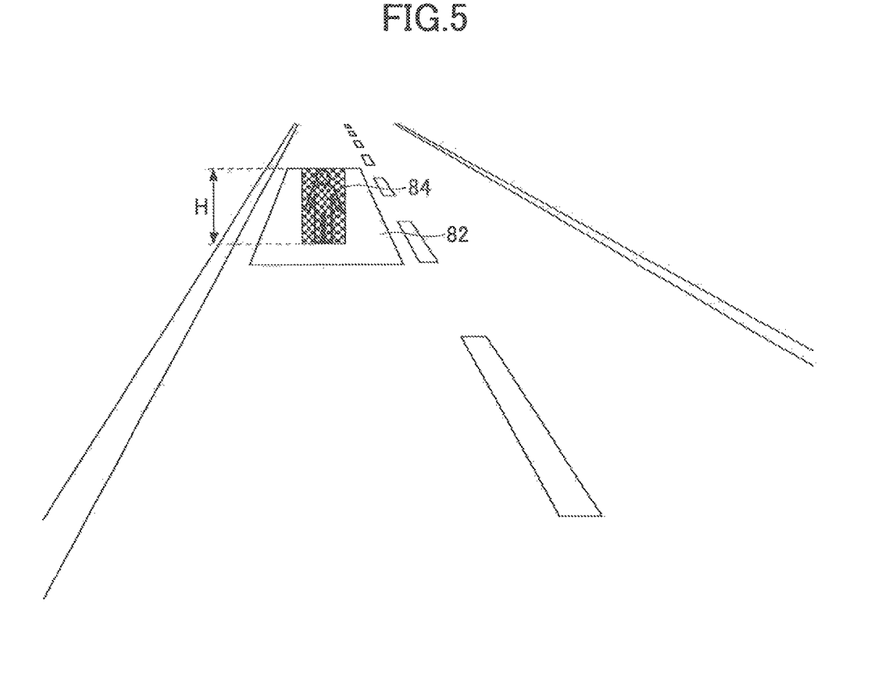
FIG. 5 is a diagram explaining an image portion 84 for obstacle illumination.

In step S208, the travel area image formation part 48 forms (renders) a second image for travel area and obstacle illumination, and projects the formed second image in the travel area with the projectors 52. The second image for travel area and obstacle illumination is formed such that the obstacle as a whole is featured with respect to a surrounding area. In FIG. 4, a state in which the second image 80 according to an example is projected on the road is schematically illustrated in a plan view. In the example illustrated in FIG. 4, the second image 80 includes an image portion 82 for travel area illumination and an image portion 84 for obstacle illumination. In the example illustrated in FIG. 4, the image portion 82 for travel area illumination is a portion of the rendered silhouette of the vehicle, and the image portion 84 for obstacle illumination is a portion rendered in a checkered pattern. It is noted that black portions of the checkered pattern may be formed with shades (i.e., parts in which the light is not illuminated, or parts in which the illumination strength is lower than that of a neighboring area). The image portion 84 for obstacle illumination may be superimposed on the image portion 82 for travel area illumination. In this case, the first image for travel area illumination corresponds to an image obtained by subtracting the image portion 84 for obstacle illumination from the second image for travel area and obstacle illumination. The travel area image formation part 48 may repeatedly turn on and off (i.e., flash) the image portion 84 for obstacle illumination, and may not flash (i.e., remains the turned on state of) the image portion 82 for travel area illumination. At that time, the travel area image formation part 48 may implement the projection such that the image portion 84 for obstacle illumination is superimposed on the obstacle with Projection Mapping technique and the image portion 82 for travel area illumination is superimposed on the road surface with Projection Mapping technique. In FIG. 5, an example of a relationship between the image portion 84 for obstacle illumination and the obstacle (the pedestrian in this example) is schematically illustrated from a view point of a driver of the vehicle. The image portion 84 for obstacle illumination is projected to be superimposed on the obstacle (the pedestrian in this example) as a whole, as described above. For example, a height H of the obstacle can be detected with the image sensor 10 (or the height can be predicted based on the type of the obstacle), the direction in which the image portion 84 for obstacle illumination is to be projected may be adjusted such that the height of the image portion 84 becomes greater than or equal to the height H at the position of the obstacle on the road. It is noted that if the obstacle exists at such a location that the image portion 82 for travel area illumination is projected only in a part of the obstacle (foot of the pedestrian, for example) (if the obstacle on the further side starts to enter the travel area from the further side), the travel area image formation part 48 may move the second image for travel area and obstacle illumination as a whole to the further side such that the image portion 84 for obstacle illumination is to be projected on the obstacle as a whole, or may project only the image portion 84 for obstacle illumination such that the image portion 84 is out of the image portion 82 for travel area illumination from the further side, if possible.

According to the process illustrated in FIG. 2, if the obstacle enters the travel area, the second image for travel area and obstacle illumination is projected with the projectors 52. With this arrangement, the driver can recognize the travel area after the predetermined time ΔT1, and can detect the existence of the obstacle, which enables the driver to perform operations for avoiding the obstacle, if necessary. Further, the image portion 84 for obstacle illumination is projected to be superposed with the obstacle as a whole. Thus, if the obstacle is a human, the human can immediately recognize the approach of the vehicle. This is because a human tends to recognize the light more easily when the eyes are illuminated than when only the foot is illuminated. Further, the image portion 84 for obstacle illumination is flashed. Thus, if the obstacle is a human, the human can immediately recognize the approach of the vehicle. Further, even for the driver, it becomes easier to recognize the existence of the obstacle, which enables the driver to immediately perform operations for avoiding the obstacle, if necessary.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions have been described in detail, it should be understood that the various changes, substitutions, and alterations could be made hereto without departing from the spirit and scope of the invention. Further, all or part of the components of the embodiments described above can be combined.

For example, according to the embodiment, the image portion 84 for obstacle illumination is rendered in the checkered pattern, which enables featuring the image portion 84 for obstacle illumination with respect to the image portion 82 for travel area illumination, and thus enables increasing the attention attracting capability. However, only rendering the first image and the second image differently can increase the attention attracting capability. Further, a way of featuring the image portion 84 for obstacle illumination with respect to the image portion 82 for travel area illumination may be different. For example, the brightness of the image portion 84 for obstacle illumination may be made higher than that of the image portion 82 for travel area illumination. Further, the difference between the image portion 82 for travel area illumination and the image portion 84 for obstacle illumination may be such that only the image portion 84 for obstacle flashes. It is noted that, even in this case, the first image and the second image differ in that the second image includes the flashing image portion 84 for obstacle illumination. Alternatively, the image portion 84 for obstacle illumination may be surrounded with an outer frame portion whose illuminance is enhanced, or may be formed in such color that has a high attention attracting capability, such as red, for example.

Further, according to the embodiment, the image sensor 10 and the forward radar sensor 16 are used as an example of an obstacle detection apparatus; however, any of the image sensor 10 and the forward radar sensor 16 may be omitted.

Further, according to the embodiment, the projectors 52 are integrally incorporated in the head lamps 50; however, the projectors 52 may be provided outside of the head lamps 50, Further, the projectors 52 may include two or more projectors which includes a first projector that projects the image portion 82 for travel area illumination and a second projector that projects the image portion 84 for obstacle illumination.

Further, in the embodiment described above, the projectors 52 may be of any types. For example, the projector 52 may be of such a projector type (mirror element projector type) that uses micro mirror elements. In this case, the projector 52 includes a lamp as a light source, a mirror device, and a lens for imagining the light from the mirror device. The mirror device includes a number of micro mirror elements arranged therein for controlling reflection directions of the light from the lamp. The micro mirror elements in the mirror device can mechanically change inclination angles according to electrical inputs. Thus, the incident light components to the respective micro mirror elements are selectively subject to modulation (shaded, reduced, etc.,) for the reflection directions according to the inclination angles of the respective micro mirror elements that can be selectively changed. Alternatively, the projector 52 may be of a liquid crystal projector type. In this case, the projector 52 includes a lamp as a light source, a liquid crystal panel, and a lens for imagining the light passing through the liquid crystal panel. The liquid crystal panel includes a number of liquid crystal elements arranged therein for controlling transmission of the light from the lamp. The reflection/transmission states of the incident light components from the light source can be changed by changing voltages applied to the respective liquid crystal elements in the liquid crystal panel. Thus, the light components from the light source can be reduced or shielded by differentiating the voltages applied to the respective liquid crystal elements. Alternatively, the projector 52 may be of a LED matrix type. In this case, the projectors 52 includes an LED array in which a number of LED chips are arranged and a number of lenses for imaging the light from the LED array. The light amounts of the respective LED chips can be differentiated by changing current values or current supply duration times for the respective LED chips.

Further, according to the embodiment described above, the projectors 52 are provided in the front portion of the vehicle (i.e., the projectors 52 are provided such that the image is projected ahead of the vehicle); however, similar projectors may be provided in a rear portion of the vehicle, in addition to or instead of the projectors 52. Even in this case, the same function can be implemented when the vehicle travels in the back direction.

Further, according to the embodiment described above, the image portion 84 for obstacle illumination is projected for the obstacle as a whole; however, the image portion 84 for obstacle illumination may be projected for a part of the obstacle. For example, if the obstacle is a pedestrian, the image portion may be projected for only an upper-body of the pedestrian. Further, the image portion 84 for obstacle illumination does not necessarily precisely correspond to the obstacle as a whole, and thus may be slightly greater than the obstacle as a whole, or may be slightly shifted in up, down, left or right direction with respect to the obstacle due to errors, etc.

The present application is based on Japanese Priority Application No. 2014-122487, filed on Jun. 13, 2014, the entire contents of which are hereby incorporated by reference.

DESCRIPTION OF REFERENCE SYMBOLS 1 lighting apparatus for a vehicle
10 image sensor
16 forward radar sensor
30 vehicle speed sensor
32 steering angle sensor
40 control ECU
42 travel area prediction part
44 obstacle detection part
46 travel area entering determination part
48 travel area image formation part
50 headlamp
52 projector
80 second image

The invention claimed is:

1. An illumination apparatus for a vehicle, the illumination apparatus comprising:
   a projector configured to project an image of visible light;
   an obstacle detection apparatus configured to detect an obstacle; and
   a processing apparatus configured to
      predict a travel area of the vehicle after a predetermined time or a predetermined distance of travel,
      project a first image with the projector in the predicted travel area upon no obstacle in the predicted travel area being detected by the obstacle detection apparatus, and
      project a second image, which is different from the first image, with the projector in the predicted travel area upon the obstacle in the predicted travel area being detected by the obstacle detection apparatus,
         the second image including a first image portion and a second image portion,
         the first image portion being projected on an area related to the obstacle as a whole in the travel area in such a manner that the first image portion is superimposed on the obstacle as a whole, and a direction in which the first image portion is projected is adjusted according to a height of the obstacle, and
         the second image portion being projected on another area in the travel area.

2. The illumination apparatus for a vehicle of claim 1, wherein the second image includes the first image portion that flashes and the second image portion that does not flash.

3. The illumination apparatus for a vehicle of claim 1, wherein the first image portion is brighter than the second image portion.

* * * * *